US005739653A

United States Patent [19]

Coy

[11] Patent Number: 5,739,653

[45] Date of Patent: Apr. 14, 1998

[54] SERVO MOTOR FEEDBACK USED AS DRIVE TRAIN DIAGNOSTIC

[75] Inventor: Gerald L. Coy, Webster, N.Y.

[73] Assignee: Xerox Corporation, Stamford, Conn.

[21] Appl. No.: 777,017

[22] Filed: Jan. 21, 1997

[51] Int. Cl.[6] .................... B41J 29/38; H02P 1/00

[52] U.S. Cl. .................... 318/560; 318/561; 318/16; 318/282; 101/91; 400/74; 156/441.5

[58] Field of Search .................... 318/560–696, 318/6, 16, 282, 283, 254; 156/441.5, 350, 360; 53/52, 266.1, 383.1; 364/464.02; 101/91; 400/74, 54; 355/206, 209; 74/336 R; 271/117, 110, 258.01, 258.04

[56] References Cited

U.S. PATENT DOCUMENTS

| | | | |
|---|---|---|---|
| 4,429,333 | 1/1984 | Davis et al. | 358/293 |
| 4,451,030 | 5/1984 | Teeter et al. | 271/265 |
| 4,536,077 | 8/1985 | Stoffel | 355/8 |
| 4,571,636 | 2/1986 | Itoh | 358/285 |
| 4,673,285 | 6/1987 | Shogren | 355/23 |
| 5,314,566 | 5/1994 | Gallagher et al. | 156/441.5 |
| 5,355,068 | 10/1994 | Eckert, Jr. et al. | 318/282 |
| 5,415,089 | 5/1995 | Eckert, Jr. et al. | 101/91 |
| 5,433,537 | 7/1995 | Gallagher et al. | 400/74 |
| 5,526,741 | 6/1996 | Gallagher et al. | 101/91 |
| 5,544,579 | 8/1996 | Gallagher et al. | 101/91 |
| 5,609,067 | 3/1997 | Mitchell et al. | 74/336 R |
| 5,622,364 | 4/1997 | Dutton et al. | 271/117 |

OTHER PUBLICATIONS

Xerox Disclosure Journal, vol. 8, No. 3, May/Jun. 1983, p. 263.

*Primary Examiner*—Paul Ip
*Attorney, Agent, or Firm*—John M. Kelly

[57] ABSTRACT

Diagnosis of servo motor driven drive train problems based upon changes in the rotational velocity of the servo motor as electrically operable drive line components are selectively engaged. The unloaded (unloaded) rotational velocity of a servo motor is determined, a drive train component that couples a load to the servo motor is energized, the change in the rotational velocity of the servo motor caused by engaging the drive train component is determined, and, if the servo motor rotational velocity falls outside of a predetermined limit the drive line fault that causes that rotational velocity to fall outside of that limit is identified. Beneficially, the status of the drive train is sent to a remote location using a data link.

11 Claims, 4 Drawing Sheets

SERVO MOTOR FEEDBACK USED AS DRIVE TRAIN DIAGNOSTIC

FIELD OF THE INVENTION

The present invention relates to drive train diagnostics. In particular, it relates to diagnosing servo motor driven drive trains using changes in the rotational velocity of the servo motor as drive train loads are selectively coupled to the servo motor. The present invention particularly relates to diagnosing servo motor driven drive trains that move documents.

BACKGROUND OF THE INVENTION

Document handlers that move documents across input scanning stations have been known and used for many years. Modern document handlers are able to move more than 50 documents per minute past an input scanning station. Generally, document handlers are comprised of a constant velocity transport (CVT) that moves documents at a constant velocity across the input scanning station and of a feeder transport that moves documents from an input tray into the CVT document transport.

Some document handlers are called upon to move documents such the both sides of a document are scanned. This is often called duplex scanning. While various types of duplex scanners are possible, it is common to use a turn buckle to invert the document being scanned so that the second side can be passed across the imaging station. This avoids the need for two imaging stations, one for each side of the document. When turn buckles are used, to reduce costs it is common to use electrically operated clutch mechanisms and solenoids to selectively engage and disengage document transport components so as to achieve document feeding, scanning and reversing. While a document handling system for feeding, scanning, and reversing a document is described subsequently, briefly, that system includes a servo motor driven drive train wherein a servo motor, in conjunction with an electronic controller, drives various mechanical and electrical components to achieve the desired function.

As scanners, printers, copiers, facsimile machines and other document handling devices evolve it becomes increasingly important to provide faster, yet more reliable and more automatic document handlers. Achieving these goals is difficult, partially because documents come in a variety of sizes, types, weights, thickness, materials, conditions, and susceptibility to damage. Furthermore, documents may have curls, wrinkles, tears, "dog-ears", cut-outs, overlays, tape, paste-ups, punched holes, staples, adhesive or slippery areas, or other irregularities. Documents also may have typing, smearable inks, freshly printed ink jet printer output, fuser oil or other materials thereon that are susceptible to smearing or contamination by document handlers. Therefore, handling original documents, particularly delicate, valuable, thick or irregular documents, is frequently much more difficult and critical than feeding blank copy sheets.

Further complicating document handling is that proper registration and timing of documents is very important. If the document is not properly fed and registered, then undesirable dark borders and/or edge shadow images may result in the digitized image, or information near an edge of the document may be lost, i.e., not imaged. Document misregistration, especially skewing, can also adversely affect feeding, ejection, and/or restacking of the documents.

From the above it can be seen that proper operation of document handlers is very important. Unfortunately, it is not always easy to diagnosis problems that occur in the overall document transport system. The large number of drive line components, as well as their interactions and their locations, which tend to be hidden within the body of the machines which use the document handlers, make drive train problem diagnosis difficult and time consuming. Because many machines that use document handlers are very important to their owners and operators, excessive downtime can be costly and inconvenient. Therefore, an automated method of diagnosing document transport systems that use servo motors and clutches would be beneficial. Furthermore, because of the variety and complexity of modem machines that use document handlers, it is not always convenient to bring all of the components, supplies, tools, and manuals required to service any problem of a machine being serviced. Therefore, an automated method of diagnosing document transport systems that could be run remotely would be even more beneficial since a repair technician could then bring the required items for the service call.

Informative references on document handlers include Xerox Corp. U.S. 4,536,077 issued Aug. 20, 1985 to James C. Stoffel; Xerox Disclosure Journal (XDJ) publication dated May/June 1983 by Richard E. Smith, Vol. 8, No. 3, p. 263; Xerox Corp. U.S. 4,673,285 issued 1987 to Shogren; Mead Corp. Davis et al. U.S. 4,429,333, issued in 1984; U.S. 4,571,636, assigned to Fuji Xerox, issued Feb. 18, 1986, filed Dec. 21, 1983, based on Japanese App. 57-222904 filed Dec. 21, 1982, entitled "Device for reading images of both surfaces of an original in one pass;" Xerox Corp. U.S. 4,451,030 by D. Teeter, et al., and the citations therein.

SUMMARY OF THE INVENTION

The principles of the present invention provide for the automated diagnosis of problems in servo motor driven drive trains, beneficially in a manner such that the status of the drive train and a diagnosis of any drive train problems are available at a remote location. A method according to the principles of the present invention provides for automated diagnosing of a servo motor driven drive trains having components that can be selectively and automatically engaged and disengaged, such as electrically controllable solenoids and/or clutches. That method includes the steps of determining the unloaded rotational velocity of a servo motor, selectively and automatically engaging various drive train components, determining changes in the servo motor rotational velocity that result from engaging the various drive train components, and identifying drive train faults based upon whether or not the changes in the servo motor rotational velocity fall within predetermined limits. Beneficially, the method includes the step of communicating the status of the drive train to a remote location using a data link.

The principles of the present invention further provide for a servo motor driven drive train that includes automated drive train diagnostic capability, beneficially including components that provide for communicating the status of the drive train to a remote location using a data link. A servo motor driven drive train according to the principles of the present invention includes a servo motor, an encoder for determining the rotational velocity of that servo motor, a drive train having a selectively engaged, electrically operable drive train component such as a clutch or solenoid, and a controller for selectively causing said servo motor to operate unloaded, for selectively causing said electrically operable drive train component to increase the rotational load of said servo motor by engaging additional drive train components, for determining both the unloaded and the loaded rotational velocity of said servo motor, for determining whether the loaded rotational velocity is within a predetermined proportion of the unloaded rotational velocity, and for identifying a drive train fault if the loaded rotational velocity is outside of the predetermined unloaded rotational velocity. Beneficially, the servo motor driven drive train includes a data terminal for transmitting drive train fault information to a remote location.

The principles of the present invention further provide for a document handler having a servo motor; an encoder that is operatively coupled to said servo motor for generating encoder signals that depend upon the rotational velocity of the servo motor, a drive train driven by the servo motor and that includes an electrically operable solenoid and an electrically operable clutch, and a controller. The controller selectively energizes the servo motor while operating the solenoid and the clutch such that the servo motor operates unloaded. The controller then determines the unloaded rotational velocity of the servo motor and then selectively engages the clutch so as to increase the rotational load on the servo motor to a first load. The controller then determines the rotational velocity of the servo motor at the first load and determines whether the rotational velocity of the servo motor at the first load is within a predetermined proportion of the unloaded rotational velocity. If not, the controller identifies a drive train fault. Beneficially, the document handler further includes a data terminal for transmitting drive train fault information to a remote location.

BRIEF DESCRIPTION OF THE DRAWINGS

Various features and advantages of the present invention will be apparent from the specific apparatus and its operation described in the example below, as well as the claims, particularly when taken in conjunction with the following drawings in which:

DETAILED DESCRIPTION OF THE PREFERRED EMBODIMENT

Figure 1:
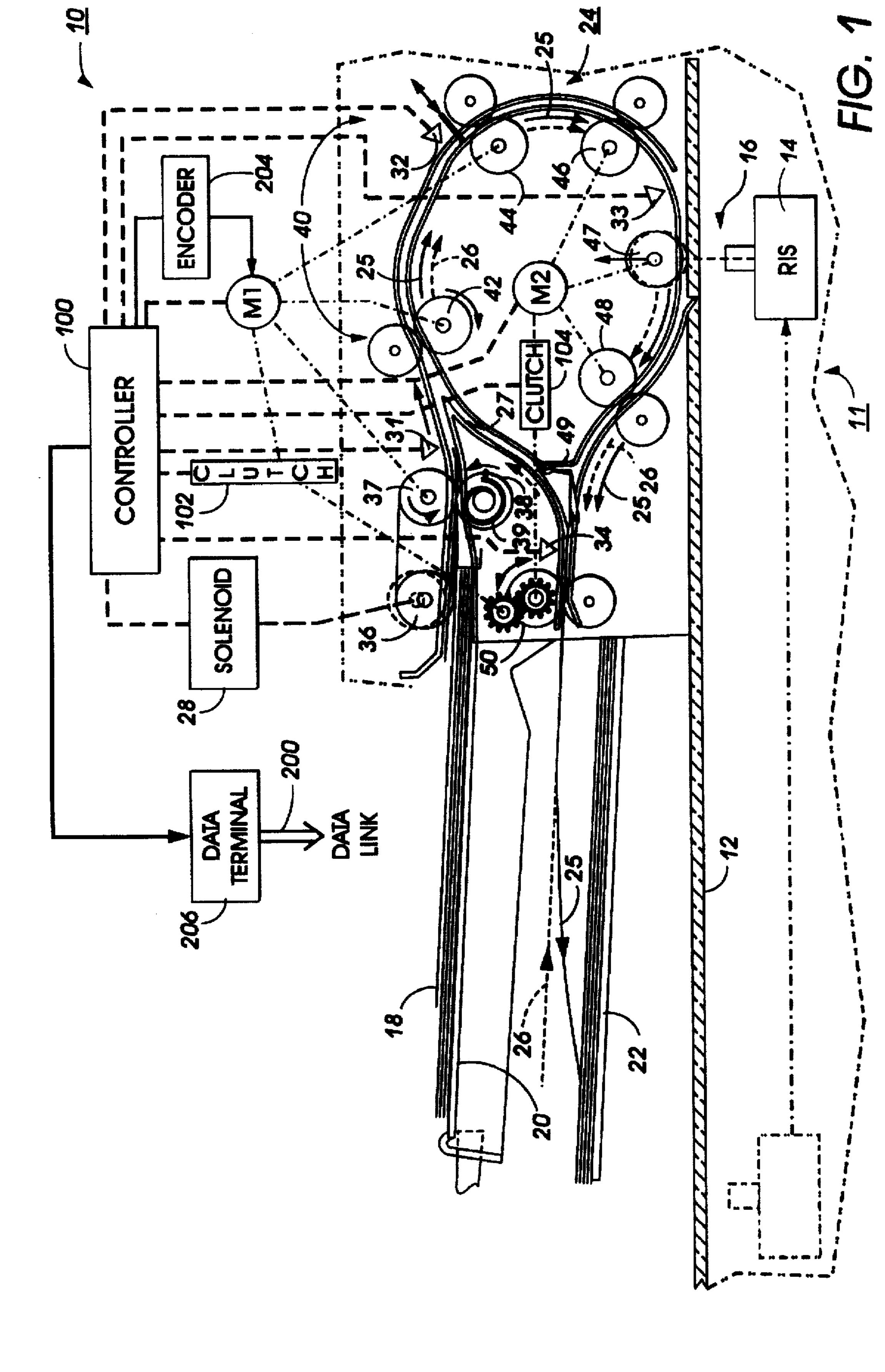
FIG. 1 is a partially schematic front view of an exemplary compact document handling system suitable for use with the subject invention.

The principles of the present invention provide for automated testing of servo motor drive line systems. FIG. 1 presents an exemplary embodiment of a document handler 10 that incorporates those principles. The document handler 10, which is of the type frequently used in electronic copiers and scanners, provides for duplex imaging. It is desirably pivotal about a pivot axis at the rear of a module 11. Such pivoting is common for document handlers because pivoting exposes an imaging platen 12 onto which an operator can optionally manually place a document for imaging. A document on the platen 12, whether manually placed or automatically feed, is scanned by a raster input scanner, or RIS, 14, at an imaging station 16.

To operate the document handler using document feeding an operator loads documents 18 face up and in normal order in the document input tray 20. The document handler then feeds the documents through a short, highly compact, "U" shaped document path 24 for imaging by the RIS. After simplex imaging a document, that document is fed directly into an output tray 22 in a face down configuration. However, as will be described, there is a difference in the document paths for simplex scanned documents as compared to duplex scanned documents. This is illustrated by solid arrows that representing the simplex document path 25 and by dashed arrows that representing the duplex path 26. It should be noted that the U-shaped document path 24 itself contains a single natural inversion for turning each document sheet over once between its feeding from input tray 20 and the imaging station 16. This is the only inversion in document path 25.

Note however that both simplex and duplex documents are ejected and restacked in the same document output tray 22 after copying. As shown in FIG. 1, the input tray 20 is closely superimposed above the document output tray 22. That is, the two trays closely overly one another to form a relatively small enclosed space between the two trays. This space provides a protected, space saving inverter chute for duplex documents while they are being inverted.

Document movement is achieved using a feeder servo motor M1, a constant velocity transport (CVT) system having a CVT servo motor M2, and associated drive train components. Overall document motion is controlled by a controller 100, which may be of the type known in the prior art and may include one or more microprocessors or microcontrollers. Connecting to the controller 100 in a conventional manner are sheet path sensors, such as sensors 31, 32, 33, and 34, for detecting the leading and/or trailing edge of documents being through the document handler 10. Based upon the states of the sensors the controller selectively controls the feeder servo motor M1, the CVT servo motor M2, a nudger solenoid 28 that selectively lifts a nudger roll 36 onto and off of documents 18 in the input tray, a feeder clutch 102, and a CVT clutch 104. Thus, the sheet path sensors provide the controller with information about the position of documents within the document handler. Because a document moves at a known speed, its position can be predicted by simple timing in a well known manner.

As previously stated, the nudger solenoid 28, a part of the feeder system, sequentially moves a nudger roll into contact with the top document in the input tray 20. When the nudger roll 36 contacts the top document, that document, and possibly others, are driven into a positive retard separating nip comprised of a driven first feeder roll 37 and an undriven retard roll 38. The driven feeder roll 37 rotates to feed the top-most document into the document path 24, while subsequent or underlying documents are retarded by the retard roll 38. To prevent wear spots on the retard roll 38, that roller is allowed some limited rotational movement. However, this retard roller rotation is resisted by a connected return spring 39.

After the top document has been fully acquired and fed downstream past the sensor 31, the nudger roll 36 may be lifted to prevent an inadvertent feeding of another document and to prevent smearing of document images. By having the feeder solenoid 28 lift the nudger roll 36 after document acquisition, rather than simply mechanically camming the nudger roll away, optimized timing can be implemented to ensure nudger roll engagement without smearing.

Once a document has passed the driven feeder roll that document passes through a drive subsystem 40 of the feeder system. The operation of the drive subsystem will be described with reference to the rollers that are driven by the feeder servo motor M1, although mating and nip-defining idler rollers are also illustrated. As shown in FIG. 1, the drive subsystem is comprised of, in order: second or take-away rollers 42 and registration rollers 44 downstream thereof, (optionally with an intermediate sheet deskew buckle chamber therebetween). Those rollers advance the document along the U-shaped path and into the CVT system. It should be noted that the various components driven by the feeder servo motor are connected together by a drive shaft (which is not shown for clarity).

The CVT system includes first CVT roller 46, a second CVT roller 47 that hold a document against the imaging station 16, and a third CVT roller 48. Those rollers are all driven by the CVT motor M2. That motor is preferably a servo-motor capable of providing controlled driving of those rollers so as to provide an accurate constant velocity transport of a document across the RIS 14. Also driven by the CVT motor M2 via the CVT clutch 104 is a reversible exit nip roller 50, which is at the entrance to the output tray 22 and is past a gate 49. The gate 49 is located at the downstream end of the U-shaped document path 24, just upstream of the reversible exit hip roller 50 and at the entrance of the duplex document path 27. Significantly, the gate 49 passes documents coming from the imaging station 16, irrespective of whether they are duplex or simplex documents.

It should be understood that the document handler 10 is capable of driving a document such that both sides pass over the imaging station 16. While a document sheet is being driven the rollers 46, 47, 48, and 50 all propel the document toward the output tray 22 at the same rate. When the leading edge of the document reaches the gate 49 that gate directs the document into the exit nip roller 50 and into the output tray 22. However, when a document is to be duplex scanned, the sensor 34 senses when the trailing edge of a document pass the gate 49. At that time the gate 49 falls down into the position shown in phantom in FIG. 1. The controller 100 then causes the CVT clutch 104 to disconnect the exit nip roller 50 from the CVT motor M2, and also causes the feeder clutch 102 to connect the exit nip roller 50 to the feed motor M1 via a simple reverse gear drive. The feed motor M 1 then drives the document backwards toward the gate 49. However, a front lip of the gate 49 directs the document along duplex path 27. The duplex path 27 forms a return path for duplex documents into the entrance of the U-shaped path 24. In its next pass through the imaging station the second side of the document is imaged.

Figure 2:
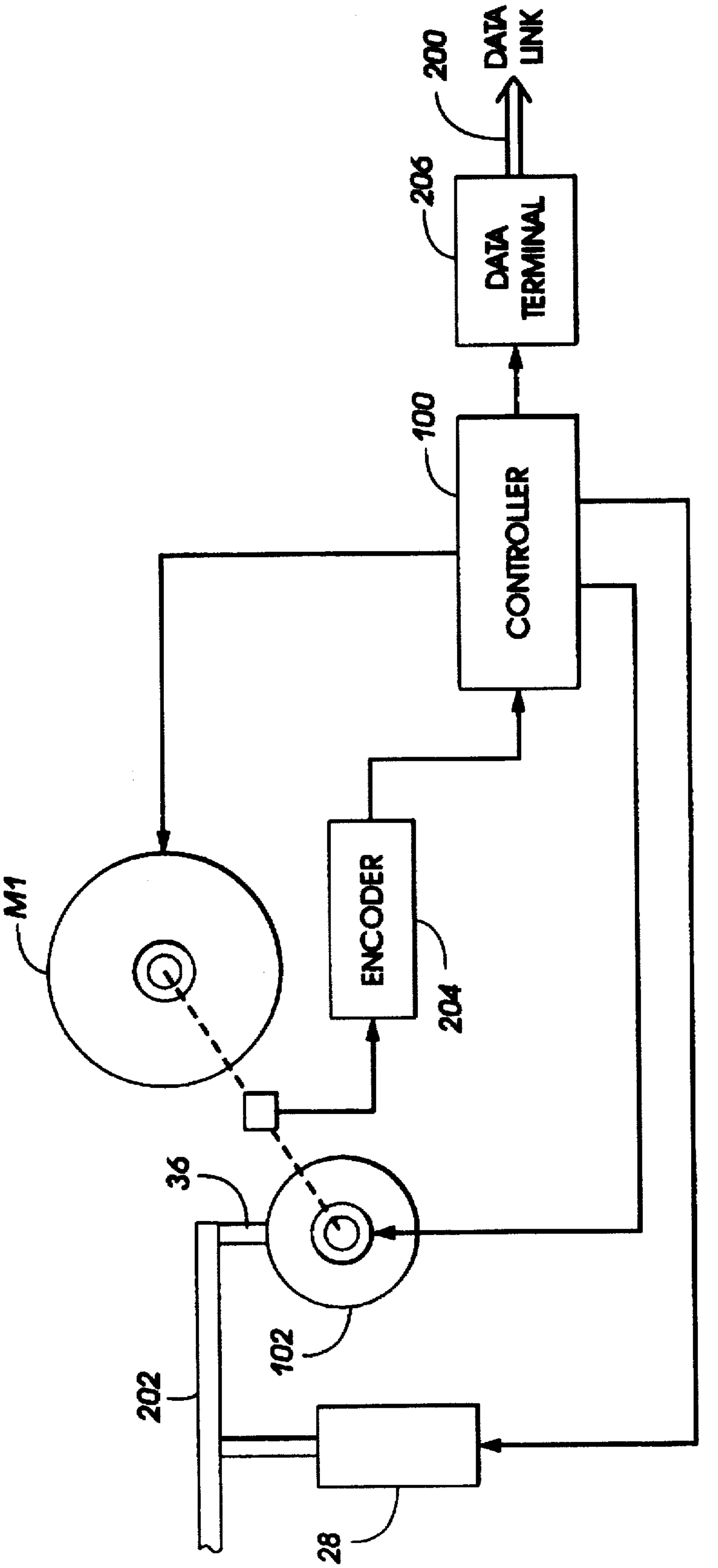
FIG. 2 is a schematic depiction of the feed motor drive train used in the document handling system of FIG. 1.

The document handler 10 is a small, compact, reliable, and relatively inexpensive document handler that has the ability to diagnose document handling problems. The diagnostic capability is explained with the assistance of FIG. 2, which is a schematic depiction of a set of components important in the diagnosis of drive train problems and for the communication of the status of the drive train to remote locations via a data link 200. FIG. 2 specifically shows the servo motor M1 coupled to the feeder clutch 102, and thus selectively to the various drive train components. Furthermore, FIG. 2 also shows the nudger solenoid 28 which moves a drive shaft that, in turn, moves the nudger roll 36. FIG. 2 also shows an encoder 204, which beneficially includes either an optical or a magnetic based rotational velocity sensor, that monitors the rotational velocity of the feeder servo motor M1. The output of the encoder is applied to the controller 100, which, as explained above, controls the motion of document through the document handler by controlling the operation of the servo motor, the feeder clutch, and the nudger solenoid. Additionally, the controller also operates a data terminal 206, such as a modem, such that the status of the feeder servo motor driven drive train, and a diagnosis of any drive train problems, is available at a remote location. It should be understood that, individually, each of the components shown in FIG. 2 are well known in the art.

Figure 3:
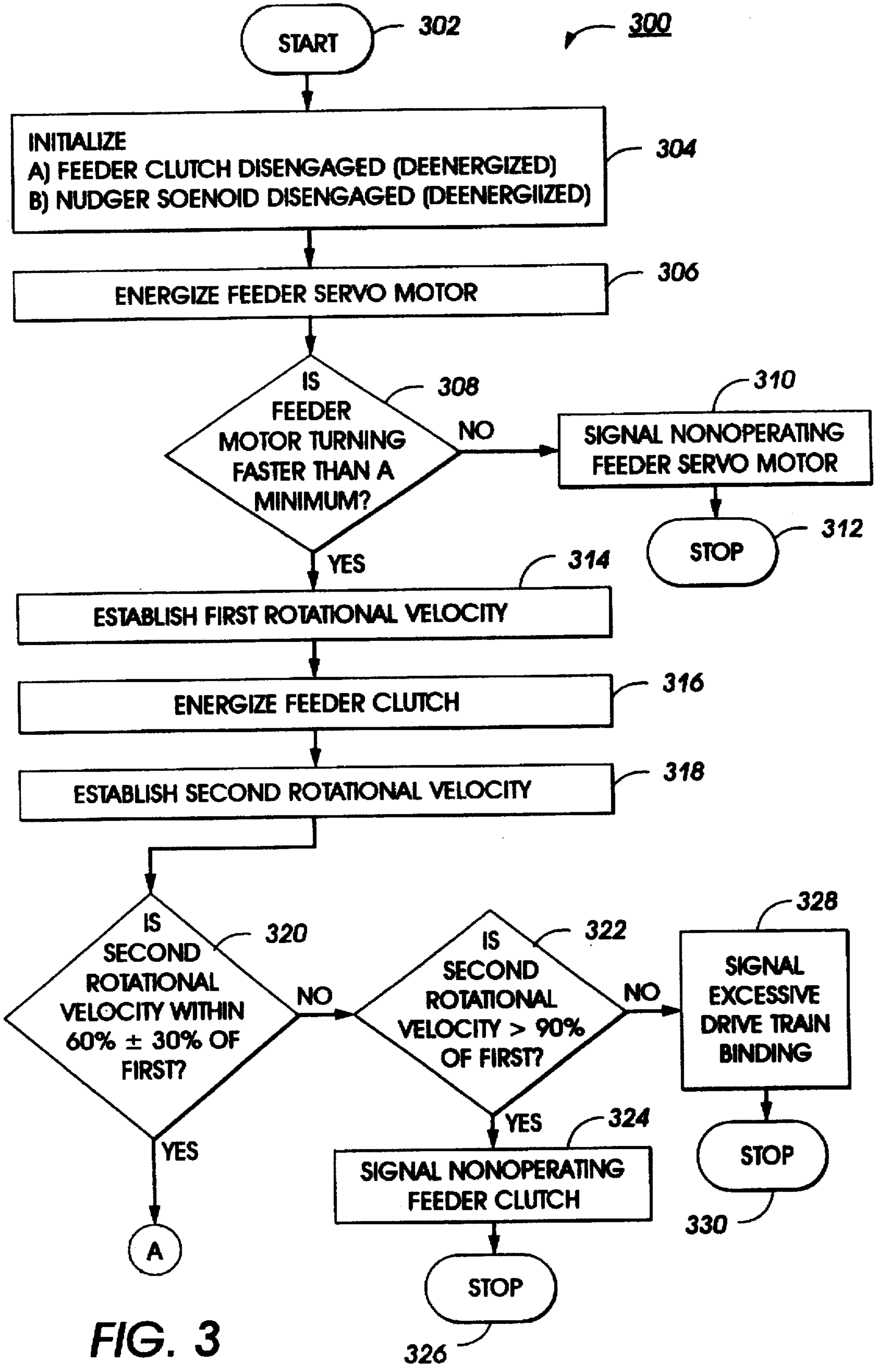
FIG. 3 is a block diagram of part of a method of testing the feed motor drive train of FIG. 2.
Figure 4:
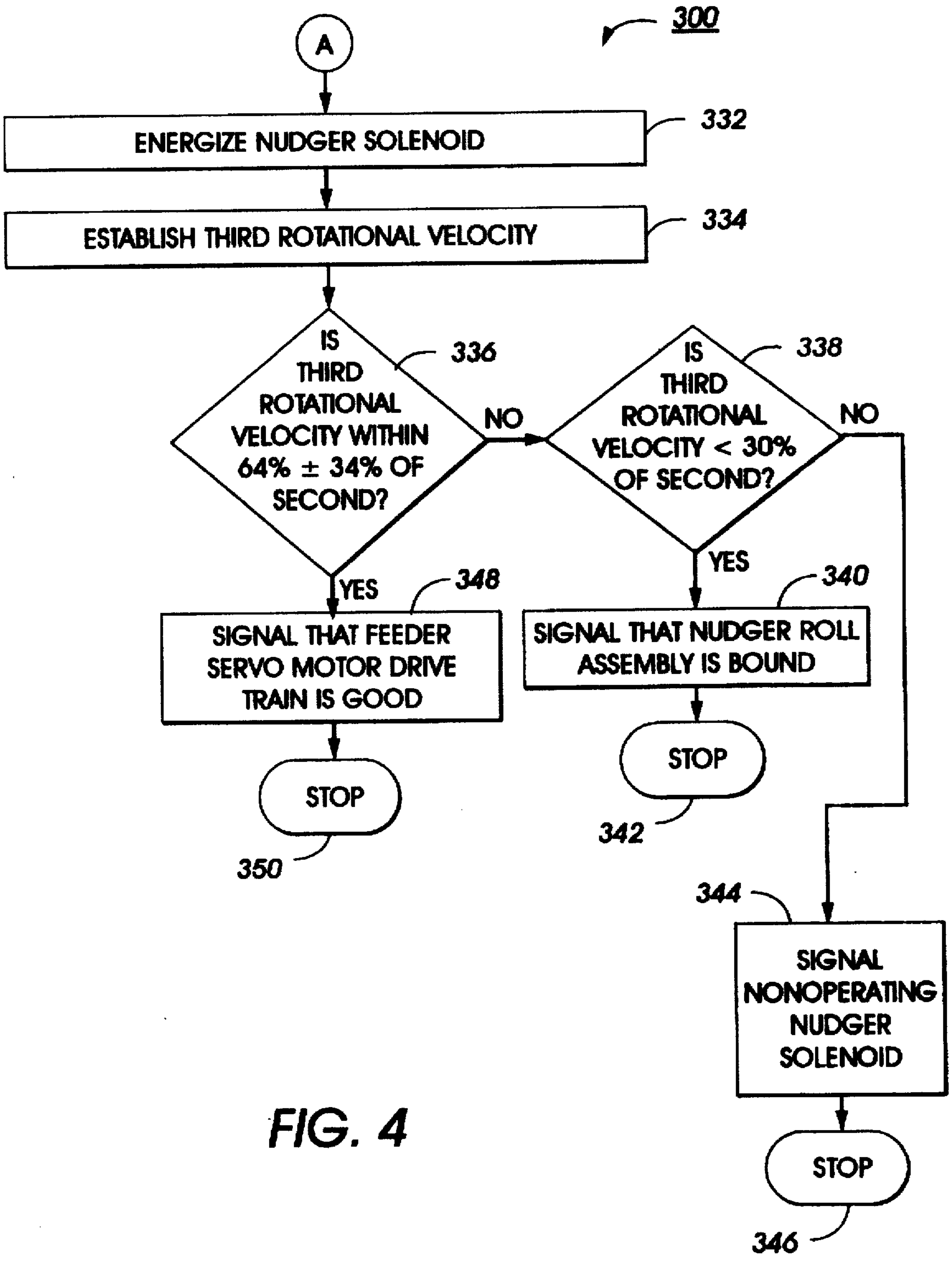
FIG. 4 is a block diagram of the remainder of the method of FIG. 3.

FIGS. 3 and 4 present a block diagram of a diagnostic routine 300 that is run by the controller 100. The diagnosit routine 300 automatically diagnoses the feeder servo motor driven drive train and transmits the status of that drive train and, if appropriate, a diagnosis of any drive train problems to a remote location. Turning now to FIG. 3, the diagnostic routine starts in block 302. Starting is beneficially performed as a result of either an operator based command (such as by entering a test code at a terminal) or upon receipt of a test code over the data link 200. If starting is a result of a test code received on the data link, the controller decodes the test code and starts the diagnostic routine 300.

After the diagnostic routine 300 starts, the controller attempts to initialize the state of the drive train to a predetermined condition, block 304. That state includes having the feeder servo motor unloaded from as many drive train components as possible such that the feeder servo motor has a minimum load, the so called unloaded condition. For example, referring to FIG. 2, the feeder clutch 102 is opened, thereby decoupling the exit nip roller 50. Additionally, since the status of the feeder clutch is not known, the nudger solenoid 28 is also controlled such that the nudger roll is lifted from the documents.

After initialization, the controller 100 energizes the feeder servo motor M1, block 306, and the output of the encoder 204 is checked to determined whether M1 is turning faster than a predetermined minimum, block 308. If M1 is not turning faster than that minimum the controller diagnoses a non-operating feeder servo motor M1 and controls the data terminal so as to transmit that diagnosis, plus the rotational velocity itself, to a remote location, step 310. The diagnostic routine 300 then stops, block 312. At this time, a service technician can rationally deduce possible causes of the problem (defective M1, defective power supply, fault in the controller, excessive load, etc.).

However, if M1 is turning faster than the predetermined minimum, the rotational velocity of the feeder servo motor is determined and stored for later use, block 314. The feeder clutch 102 is then energized (and the CVT clutch 104 is de-energized), thereby adding the rotational load of the exit nip roller 50 to M1, step 316. The output of the encoder 204 is then checked again to determine and store a second rotational velocity of M1, block 318. A determination is then made as to whether the second rotational velocity is within 60% ±30% of the first rotational velocity, step 320. If not, a drive train problem exists. To isolate that problem a determination is made as to whether the second rotational velocity is >90% of the first rotational velocity, step 322. If yes, the controller determines that there is a non-operating feeder clutch and then controls the data terminal so as to transmit that diagnosis to the remote location, step 324. The diagnostic routine 300 then stops, block 326. At this time, a service technician can rationally deduce possible causes of the problem (defective clutch, defective clutch power supply, fault in the controller, etc.). However, if step 322 shows that the second rotational velocity is not >90% of the first rotational velocity, the problem is diagnosed as an excessively loaded drive train 202. The controller transmits that diagnosis to the remote location, step 328, and the diagnostic routine stops, step 330. At this time, a service technician can rationally deduce possible causes of the problem (defective drive train, possibly due to a defective gear assembly or binding due to such problems as paper jams).

Turning now to FIG. 4, if M1 has a second rotational velocity that is within the limits of 60% ±30% of the first rotational velocity, the controller energizes the nudger solenoid 28, step 332. After a sufficient time, the output of the encoder 204 is checked once again to determine and store a third rotational velocity of M1, block 334. A determination is then made as to whether the third rotational velocity is within 64% ±34% of the second rotational velocity, step 336. If not, a drive train problem exists. To isolate that problem a determination is made as to whether the third rotational velocity is <30% of the second rotational velocity, step 338. If yes, the controller diagnosis is that the nudger assembly (the drive shaft 202 and/or the nudger roll) is bound. The controller then controls the data terminal so as to transmit that diagnosis to the remote location, step 340. The diagnostic routine 300 then stops, block 342. At this time, a service technician can rationally deduce possible causes of the problem (defective nudger assembly). However, if step 338 shows that the third rotational velocity is not <30% of the second rotational velocity, the problem is diagnosed as a nonresponsive nudger solenoid and the controller transmits that diagnosis to the remote location, step 344. The diagnostic routine 300 then stops, step 346. At this time, a service technician can rationally deduce possible causes of the problem (defective solenoid).

However, if the third rotational velocity is within 64% ±34% of the second rotational velocity the controller makes a determination that the feeder servo motor driven drive train is functional. The controller then causes the data terminal to transmit that status to the remote location, step 348. The diagnostic routine 300 then stops, step 350.

While the embodiment disclosed herein is preferred, it will be appreciated from this teaching that various alternatives, modifications, variations or improvements therein may be made by those skilled in the art. For example, a similar servo motor drive train diagnostic routine could be implemented for the CVT transport system using the rotational velocities of M2. Therefore, the principles of the present invention are intended to be encompassed by the following claims:

What is claimed is:

1. A method of diagnosing faults in a servo motor driven drive train, comprising the steps of:

(a) determining an unloaded rotational velocity of a servo motor;

(b) selectively engaging an electrically operable drive train component, whereby the rotational load of the servo motor increases and the rotational velocity of said servo motor to decrease;

(c) determining the rotational velocity of said servo motor with said electrically operable drive train component engaged;

(d) comparing the unloaded rotational velocity determined in step (a) with the rotational velocity determined in step (c) to determined whether the rotational velocity determined in step (c) is within a predetermined proportion of the unloaded rotational velocity; and (e) identifying a drive train fault if the rotational velocity determined in step (c) is outside of the predetermined proportion of the unloaded rotational velocity.

2. The method according to claim 1, wherein the drive fault identified in step (e) is transmitted over a data link to a remote location.

3. The method according to claim 1, wherein the selectively engaged electrically operable drive train component is a solenoid.

4. The method according to claim 1, wherein the selectively engaged electrically operable drive train component is a clutch.

5. A servo motor driven drive train, comprising:

a servo motor;

an encoder for determining the rotational velocity of said servo motor;

a drive train having a selectively engaged, electrically operable drive train component and which is operatively coupled to said servo motor, wherein electrically operable drive train component can be electrically operated to increase the rotational load of said servo motor; and a controller operatively connected to said servo motor, to said encoder, and to said electrically operable drive train component, said controller for selectively causing said servo motor to operate unloaded, for selectively causing said electrically operable drive train to increase the rotational load of said servo motor, for determining both the unloaded and the loaded rotational velocity of said servo motor, for determining whether the loaded rotational velocity is within a predetermined proportion of the unloaded rotational velocity, and for identifying a drive train fault if the loaded rotational velocity is outside of the predetermined unloaded rotational velocity.

6. The servo motor driven drive train according to claim 5, further including a data transmitter, operatively connected to said controller, for transmitting drive train fault information to a remote location.

7. The servo motor driven drive train according to claim 5, wherein said selectively engaged, electrically operable drive train component is a solenoid.

8. The servo motor driven drive train according to claim 5, wherein said selectively engaged, electrically operable drive train component is a clutch.

9. A document feeder, comprising:

a servo motor;

an encoder, operatively coupled to said servo motor, for generating encoder signals that depend upon the rotational velocity of said servo motor;

a drive train operatively coupled to said servo motor and having an electrically operable solenoid and an electrically operable clutch; and a controller operatively connected to said servo motor, to said encoder, to said solenoid, and to said clutch, said controller for selectively energizing said servo motor while operating said solenoid and said clutch so as to operate said servo motor unloaded, for determining said unloaded rotational velocity of said servo motor, for selectively engaging said clutch so as to increase the rotational load on said servo motor to a first load, for determining the rotational velocity of said servo motor at said first load, for determining whether the rotational velocity of said servo motor at said first load is within a predetermined proportion of the unloaded rotational velocity, and for identifying a drive train fault if the rotational velocity of said servo motor at said first load is outside of a predetermined unloaded rotational velocity.

10. A document feeder according to claim 9, wherein said controller is further for selectively engaging said solenoid so as to increase the rotational load on said servo motor to a second load, for determining the rotational velocity of said servo motor at said second load, for determining whether the rotational velocity of said servo motor at said second load is within a predetermined proportion of the unloaded rotational velocity, and for identifying a drive train fault if the rotational velocity of said servo motor at said second load is outside of a predetermined unloaded rotational velocity.

11. A document feeder according to claim 9, further including a data transmitter, operatively connected to said controller, for transmitting drive train fault information to a remote location.

* * * * *